(12) United States Patent
Kuwajima et al.

(10) Patent No.: US 7,200,410 B2
(45) Date of Patent: Apr. 3, 2007

(54) PORTABLE TELEPHONE

(75) Inventors: Hidenori Kuwajima, Nara (JP); Takao Hasegawa, Osaka (JP)

(73) Assignee: Sharp Kabushiki Kaisha, Osaka (JP)

( * ) Notice: Subject to any disclaimer, the term of this patent is extended or adjusted under 35 U.S.C. 154(b) by 497 days.

(21) Appl. No.: 10/277,731

(22) Filed: Oct. 23, 2002

(65) Prior Publication Data

US 2003/0078076 A1 Apr. 24, 2003

(30) Foreign Application Priority Data

Oct. 23, 2001 (JP) .............................. 2001-324634

(51) Int. Cl.
*H04Q 7/20* (2006.01)

(52) U.S. Cl. ................ 455/456.4; 455/565; 455/412.2; 455/404.2

(58) Field of Classification Search ................ 455/565, 455/456.4, 528, 63.3, 67.11, 456.6, 404.2, 455/456, 95, 517, 434, 435.1, 412.2, 11.1, 455/456.1, 9
See application file for complete search history.

(56) References Cited

U.S. PATENT DOCUMENTS

| | | | | |
|---|---|---|---|---|
| 6,131,045 | A * | 10/2000 | Iwata | 455/565 |
| 6,163,695 | A * | 12/2000 | Takemura | 455/456.4 |
| 2002/0090953 | A1* | 7/2002 | Aburai et al. | 455/456 |
| 2003/0139138 | A1* | 7/2003 | Cho et al. | 455/63 |
| 2004/0029560 | A1* | 2/2004 | Ariga | 455/404.2 |
| 2004/0132426 | A1* | 7/2004 | Baiker | 455/403 |

FOREIGN PATENT DOCUMENTS

| | | | |
|---|---|---|---|
| JP | 9-261341 A1 | 10/1997 | |
| JP | 10-210134 A | 8/1998 | |
| JP | 10-304443 A | 11/1998 | |
| JP | 2937820 B2 | 6/1999 | |
| JP | 11-225378 A | 8/1999 | |
| JP | 11-284723 A2 | 10/1999 | |
| JP | 11-340901 A | 12/1999 | |
| JP | 2000-40970 A | 2/2000 | |
| JP | WO 01/01714 A1 | 1/2001 | |
| JP | 2002-141986 A | 5/2002 | |

* cited by examiner

*Primary Examiner*—Tilahun Gesesse
*Assistant Examiner*—John J. Lee
(74) *Attorney, Agent, or Firm*—Birch, Stewart, Kolasch & Birch, LLP

(57) ABSTRACT

A portable telephone which enables operations other than transmission and reception functions, such as retrieving telephone numbers, creating e-mails, playing games, without emitting strong electromagnetic waves even in areas where communication by a portable telephone is prohibited, thereby preventing occurrence of misunderstanding by or disturbance to a third person. The multifunctional portable telephone is composed of a telephone function control unit (102) for controlling telephone functions as a whole, a non-telephone function control unit (103) for controlling non-telephone functions, a system control unit (104) for controlling the entire device, an input unit (105) comprising a mode key (15), telephone function operation changeover keys (16) and (17), dial keys (18), and the like, a display unit (106), and an external notification unit (107) for externally informing the operational state of telephone functions, wherein the system control unit (104), while a function other than a function utilizing radio wave transmission or transmission and reception is being performed, stops the telephone function control unit (102) from performing radio wave transmission or transmission and reception as well as enables the external notification unit (107) to inform that radio wave transmission or transmission and reception is in a stop state.

10 Claims, 9 Drawing Sheets

PORTABLE TELEPHONE

This specification includes the contents as disclosed in the specification and/or drawings of Japanese Patent Application No. 2001-324634, which is a priority document of the present application.

BACKGROUND OF THE INVENTION

1. Field of the Invention

The present invention relates to a multifunctional portable telephone which enables use of functions which do not require transmission and reception of radio waves, such as creating e-mails, managing personal information and playing games, and in particular to a multifunctional portable telephone with a transmission and reception stop control function.

2. Description of the Related Art

In recent years, mobile communications as represented by cellular car telephones or portable telephones have become widespread, and it is thought that multifunctional portable telephones with PDA (Personal digital Assistants) function, etc. will also become increasingly popular.

Further, current portable telephones which are provided with a screen display device such as a liquid crystal panel and an input device by key-inputting etc., have functions as a telephone, that is, transmission and reception of radio waves, and in addition they are much more likely to become multifunctional by having functions for exchanging e-mails and for enjoying game-playing.

Hereinafter, the expression "telephone function" is described as a function of a telephone that involves transmission and reception of radio waves, and the expression "non-telephone function" is described as a function that does not involve the transmission and reception of radio waves, such as e-mail creation and game-playing.

When an incoming call is received while playing games downloaded onto such a multifunctional portable telephone or while composing a text message for e-mail, strong electromagnetic waves for registering location, etc. may be emitted.

Usually, when a portable telephone is turned on, the portable telephone performs communications at designated intervals in order to expressly inform a user of the state of communication with a base station, and radio waves are transmitted and received regardless of whether or not transmission for conversation is being carried out by telephone. Because radio waves may affect precision machines, areas or situations are designated in which the use of portable telephones is prohibited or restricted. That includes, needless to say, in hospitals and trains. One example is that the use of portable telephones on a crowded train might cause a malfunction in the cardiac pacemaker of a nearby passenger. Further, although this example does not show an adverse effect of electromagnetic waves, an incoming call sound at a public performance, etc. may become an annoyance to neighbors.

Due to these problems, in an area, such as in hospitals or on aircraft, where communication with portable telephones is prohibited, a practice of turning off portable telephones is adopted. However, there is the problem that turning-off makes it impossible to use all the functions of a portable telephone. Namely, even non-telephone functions that are not associated with emission of electromagnetic waves, such as viewing information, for example telephone numbers, registered in a portable telephone become unavailable. For example, because a portable telephone is turned off in a hospital, the user of the portable telephone cannot view telephone number information registered in the portable telephone in order to make a call by a public telephone.

As a method to solve these problems, for example, Japanese Patent Application Laid-Open (kokai) No. 11-284723 discloses a portable telephone which is provided with a transmission and reception stop and start button for stopping or restarting only transmission and reception functions that emit strong electromagnetic waves. In addition, there is disclosed a device which stops a function of radio wave transmission and reception in a radio communication prohibited area in Japanese Patent Applications Laid-Open (kokai) Nos. 11-225378 and 11-340901. Further, Japanese Patent Application Laid-Open (kokai) No. 10-304443 discloses a device which automatically turns off power supply in a radio communication prohibited area.

FIG. 10 is a block diagram illustrating the structure of a conventional multifunctional portable telephone. Referring to FIG. 10, the multifunctional portable telephone is composed of an antenna 1 for performing radio communication; a telephone function control unit 2 for controlling telephone functions as a whole; a non-telephone function control unit 3 for controlling non-telephone functions; a system control unit 4 for controlling the entire device; an input unit 5 comprising functional keys for inputting information into the portable telephone; and a display unit 6 comprising, for example, an LCD for displaying personal information or states of the system.

The telephone function control unit 2 is a processing circuit for realizing communications. It is composed of a microphone, a speaker, a base band section, a voice codec section, an RF control section, and the like. The RF control section converts a wave signal to an electric signal by use of the antenna 1. The operational state of the telephone function control unit 2 means the state of transmission and reception of radio waves.

The input unit 5 is composed of dial keys, a power key, and the like. Each of them is operated manually, and the input unit has a function of transferring the contents inputted through those manual operations to the system control unit 4 as information.

On the display unit 6, numbers inputted through the dial keys, various image planes for non-telephone functions, an icon indicating the operational state of the telephone function, or the like are displayed.

Such a structure enables the user to turn off only the telephone function control unit 2, even when the non-telephone control unit 3 is operational. This is done by inputting specific information through the input unit 5 when the power key is operated and the portable telephone is itself turned on. The above-mentioned structure and control allows radio wave output to be stopped, and therefore non-telephone functions can be utilized even in the areas or in the situations mentioned above. At the same time, the telephone function control unit 2 is turned off and efforts to reduce power consumption can be made.

Further, it has been proposed to provide a function for informing the portable telephone user of the operational state of the telephone function by a method of displaying an icon etc. on the display unit 6.

These conventional multifunctional portable telephones, however, have the following drawbacks.

With respect to the devices disclosed in Japanese Patent Applications Laid-Open (kokai) Nos. 11-284723, 11-225378, and 11-340901, when the portable telephones are turned on, transmission and reception can only be turned to a stop state by using the transmission and reception stop and start button and it is only possible to revert to an active state by pressing the same button. However, when those portable telephones are turned off, functions other than functions relating to electromagnetic wave emission cannot directly be made available. In other words, on aircraft or in hospitals, a user has to turn off both the transmission and reception stop/release button and the power button of the portable telephone. This is inconvenient. In addition, during the stop state of transmission and reception, even operations relating to only reception such as cell search are in a stop state and thus a problem arises, that is, it takes some time before communication is available when transmission and reception is resumed.

On the other hand, with respect to the device disclosed in Japan Patent Application Laid-Open (kokai) No. 10-304443, 2 transmitters are provided at an entrance of a radio communication prohibited area. A reception unit of a portable terminal judges only whether or not transmission frequencies of the 2 transmitters are received and then, based on the judgment, power supply to a transmission unit is changed over. Because of this, such function is effective only in a radio communication prohibited area wherein 2 transmitters are provided in advance. It have been very difficult to realize the above in other radio communication prohibited areas or transportation facilities such as trains. Further, there is no disclosure on use of functions such as viewing telephone number lists in a radio communication prohibited area.

Furthermore, in the case of the above mentioned portable telephone, when a user decides that he is in an area or in a situation mentioned above where use of a portable telephone is prohibited or restricted, the user sets the portable telephone to stop its telephone function by his own operation. In addition, when the user moves to an area or a situation other than the above, the user manually resets the portable telephone so that the telephone function is usable as usual. Moreover, in order to prevent the user from forgetting this resetting operation, the portable telephone has a function to give a notification to the user of the portable telephone.

Although it is easily recognized, even from the viewpoint of a third person, that a portable telephone user is in an area or in a situation where use of the portable telephone is prohibited or restricted, a stop state of the telephone function of the portable telephone in use, that is a state wherein radio waves are not transmitted or received, can be recognized only by the user of the portable telephone.

In this case, even though the user of the portable telephone sets the portable telephone to stop its telephone function, a third person cannot recognize that the portable telephone is in the stop state. Therefore, there is considered a case wherein, when the user is overly concerned about being misunderstood by the third person, he does not use the portable telephone after all.

Further, the user of the above portable telephone has to manually set the telephone function into operation or stop. On trains or the like, the user may forget that the portable telephone is turned on. Another case may be considered wherein, depending on the user's sense of social responsibility, he does not use the above function even though it is provided on his portable telephone. In this case, when a third person using medical equipment etc. is in the vicinity, that person is disturbed considerably.

SUMMARY OF THE INVENTION

The present invention has been achieved in view of the above problems. It is an object of the present invention to provide a portable telephone which enables operations other than transmission and reception functions, such as retrieving telephone numbers, creating e-mails, playing games, without emitting strong electromagnetic waves even in a communication prohibited area for portable telephones, thereby preventing misunderstanding from or disturbance to a third person.

The portable telephone of the present invention comprises:

communication means which performs radio communication by transmission and reception of radio waves;

transmission and reception stopping means which makes possible the cessation of radio wave transmission or transmission and reception performed by the communication means;

notification means which gives notification that radio wave transmission or transmission and reception is in a stop state; and control means which controls the cessation of radio wave transmission or transmission and reception by transmission and reception stopping means while a function other than a function utilizing radio wave transmission or transmission and reception is being performed, and controls the notification by the notification means that radio wave transmission or transmission and reception is in a stop state.

Further, more preferably the portable telephone further comprises instruction means which instructs whether or not the notification is to be given by the notification means.

Furthermore, as a more preferable specific embodiment, the notification means may give notification by light or voice information.

Moreover, the portable telephone of the present invention comprises an operation key for canceling the stop state of radio wave transmission or transmission and reception stopped by the transmission and reception stopping means, wherein the control means cancels the stop state of radio wave transmission or transmission and reception, stopped by the transmission and reception stopping means, when the operation key is kept in operation for a predetermined period.

In addition, the portable telephone of the present invention comprises an operation key for canceling the stop state of radio wave transmission or transmission and reception stopped by the transmission and reception stopping means, wherein:

the control means stops radio wave transmission or transmission and reception by the transmission and reception stopping means immediately after the portable telephone is turned on; and the control means cancels the stop state of radio wave transmission or transmission and reception stopped by the transmission and reception stopping means when the operation key is operated.

Further, more preferably the portable telephone may comprise timekeeping means which measures time while radio wave transmission or transmission and reception is being performed, wherein the control means stops radio wave transmission or transmission and reception by the transmission and reception stopping means when the timekeeping means has measured a predetermined time period.

Furthermore, more preferably the portable telephone may further comprise a second notification means which informs that radio wave transmission or transmission and reception is in the stop state due to the transmission and reception stopping means or that the stop state is cancelled.

Further, more preferably the present invention is characterized in that radio wave transmission or transmission and reception of the communication means may be stopped by stopping power supply to a transmission function unit.

According to other aspect of the present invention, there is provided a portable telephone which comprises:

radio communication processing means which performs radio communication processing;

non-radio communication processing means which performs non-radio communication processing that is free from radio communication processing means;

radio communication processing stopping means which stops operation of the radio communication processing means; and notification means which gives notification that the radio communication processing means is in a stop state.

Further, preferably the above notification means of the portable telephone may be activated when the operation of the radio communication processing means is stopped by the radio communication processing stopping means.

In the case where a user is in an area or in a situation in which use of a portable telephone is prohibited or restricted but the user utilizes non-telephone functions of the portable telephone, the portable telephone of the present invention having such a structure allows a third person to easily recognize that telephone functions of the portable telephone in use are in a stop state, and thus misunderstanding or disturbance can be avoided. Even when a user of a portable telephone is present in an are or in a situation where use of the portable telephone is prohibited or restricted, a third person can easily recognize that telephone functions of the portable telephone are stopped, and thus misunderstanding or disturbance is prevented.

Further, no radio wave transmission and reception can be conducted unless the user of the portable telephone directly conducts the operations. This makes it such that the transmission of radio waves is through the express intention of the user. It can also prevent the user from forgetting to input settings or from intentionally making no setting procedure. Further, it is predicted that long telephone conversations can be avoided by stopping the call after a predetermined time.

BRIEF DESCRIPTION OF THE DRAWINGS

FIG. 6 is a flow chart illustrating an example of steps in an operation of a portable telephone according to an embodiment of the present invention immediately after power is turned on.

FIG. 7 is a flow chart illustrating another example of steps in an operation of a portable telephone according to an embodiment of the present invention immediately after power is turned on.

DESCRIPTION OF THE PREFERRED EMBODIMENTS

Hereinafter, preferred embodiments of a portable telephone according to the present invention will be described in detail by referring to the accompanying drawings.

Figure 1:
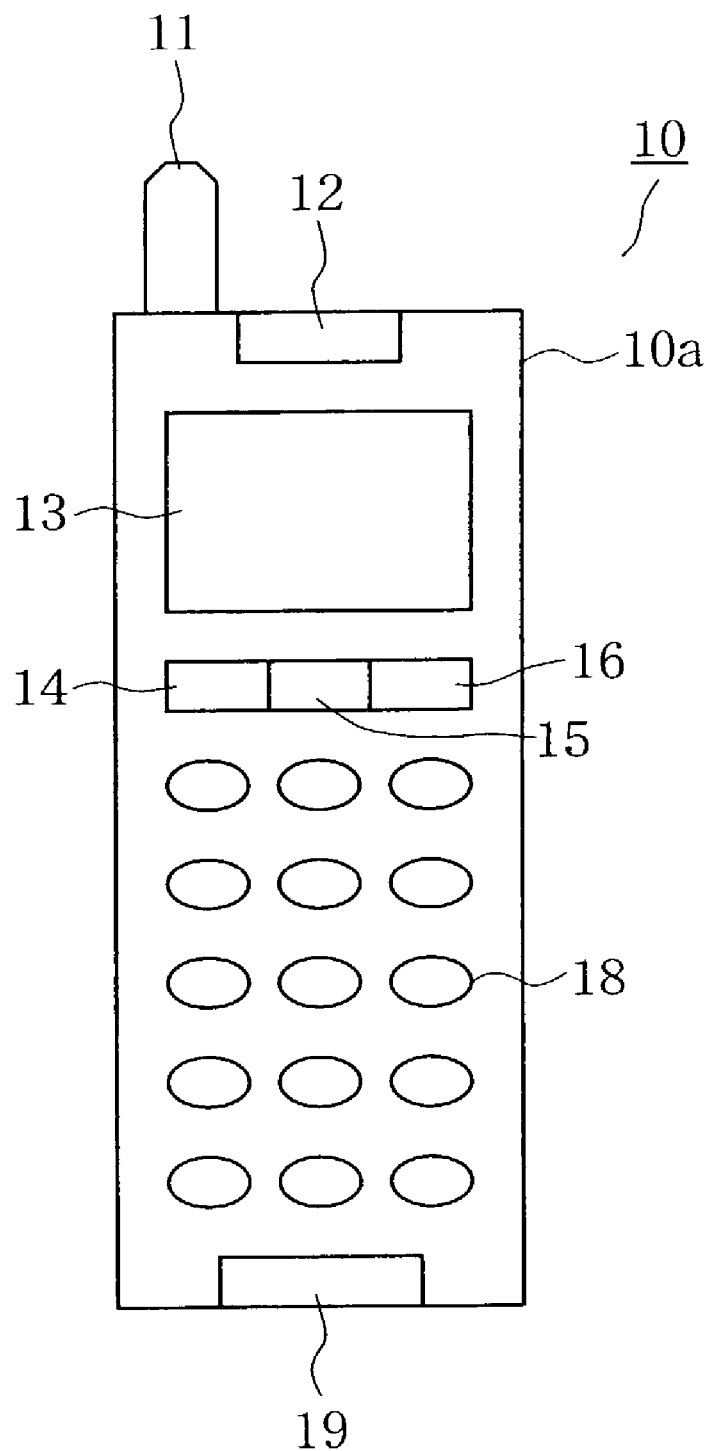
FIG. 1 is a front elevation illustrating an outer appearance of a portable telephone according to a first embodiment of the present invention.
Figure 2:
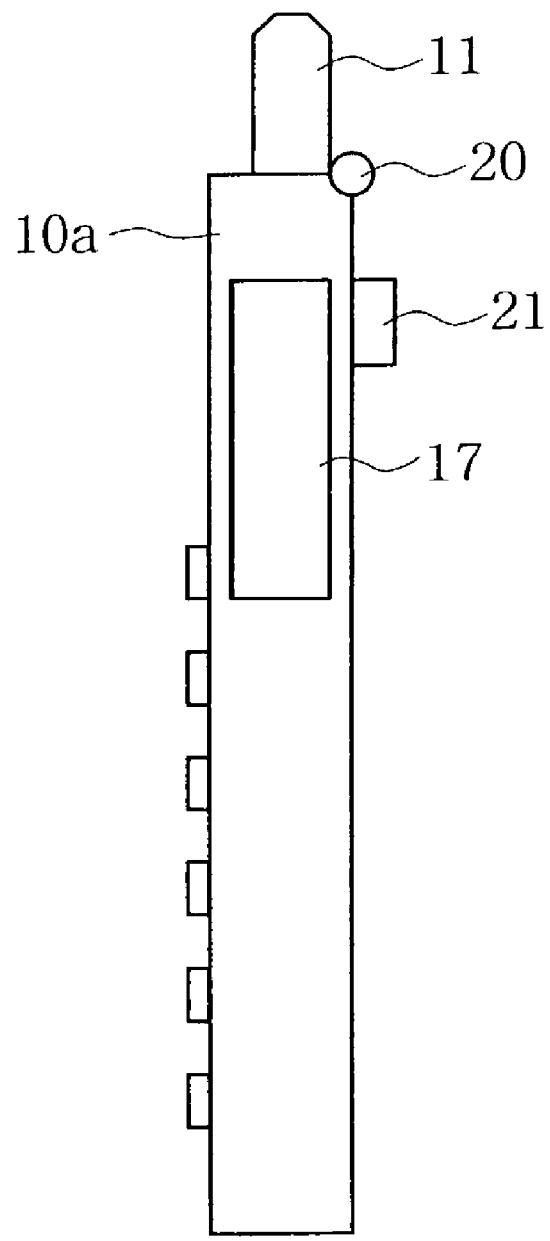
FIG. 2 is a side elevation illustrating an outer appearance of a portable telephone according to an embodiment of the present invention.
Figure 3:
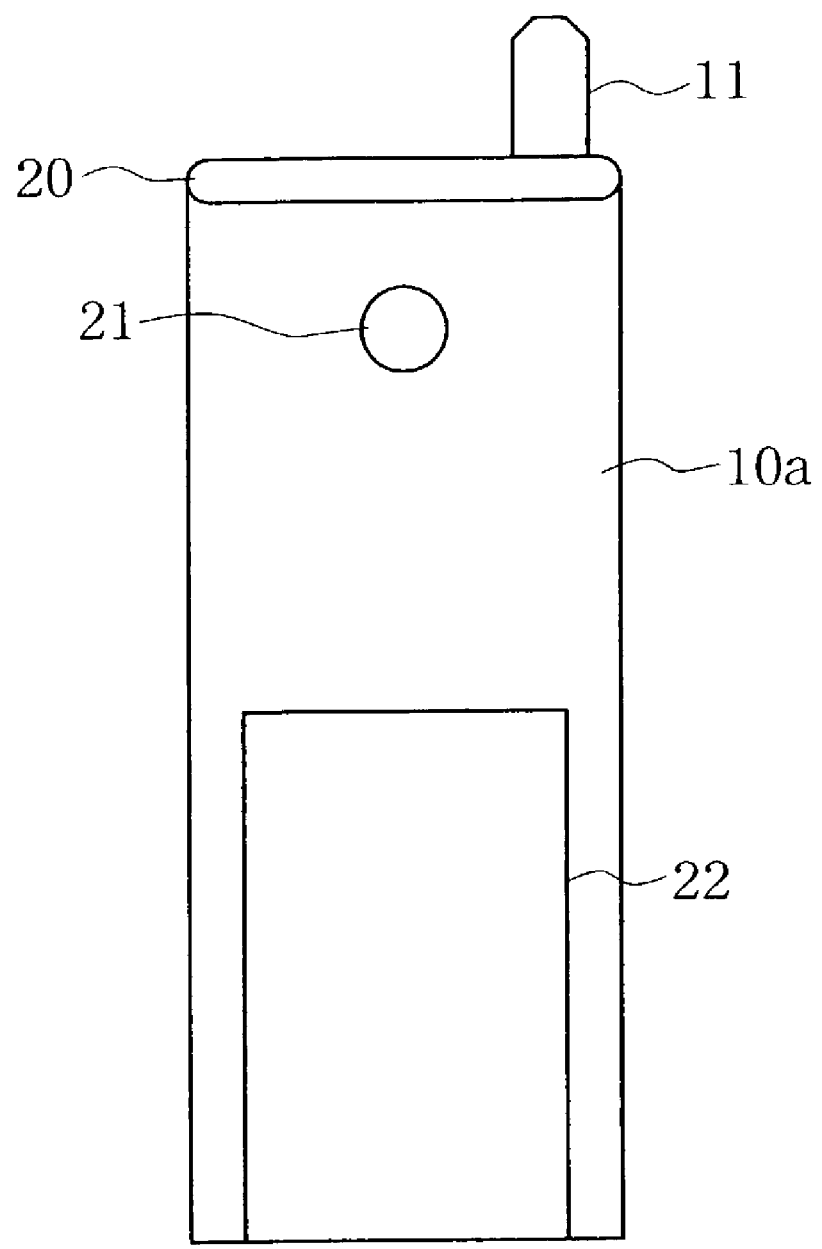
FIG. 3 is a rear elevation illustrating an outer appearance of a portable telephone according to an embodiment of the present invention.

FIG. 1 is a front elevation illustrating the outer appearance of a multifunctional portable telephone according to a first embodiment of the present invention. FIGS. 2 and 3 are a side elevation and a rear elevation thereof.

In these figures, numeral 10 represents the multifunctional portable telephone having non-telephone functions, and a main body 10a of the portable telephone 10 is composed of an antenna 11 for performing radio communication, a loudspeaker 12 for listening to calls, an LCD display unit 13 for displaying operation guidance or information received, a power key 14 for turning on or off the portable telephone, a mode key 15 for changing over various functions, a telephone function operation changeover keys 16 and 17 (FIG. 2) (instruction means) for changing over telephone functions and instructing whether or not external notification units 20 and 21 make a notification, dial keys 18 comprising membrane keys for dialing such as for inputting a telephone number, a microphone 19 for inputting speech and external notification units 20 and 21 comprising a light-emitting diode for giving an external notification of the operating state on telephone functions. Further, a battery box 22 is detachably mounted on the back face of the main body 10a. The battery box 22 is a packaged battery (hereinafter referred to as a battery pack) for activating the portable telephone 10 even in a place where commercial power sources are not available. When the main body 10a is connected to a commercial power source, the battery pack is charged through an AC adaptor, etc.

The LCD display unit 13 is composed of an LCD dot matrix display and individual drivers, etc. On the display 13, displayed are numbers inputted through the dial keys 18, various screens for non-telephone functions, icons indicating operating state of telephone functions, and the like. Further, the time is displayed during standby periods and personal information or the state of the system is displayed.

Figure 4:
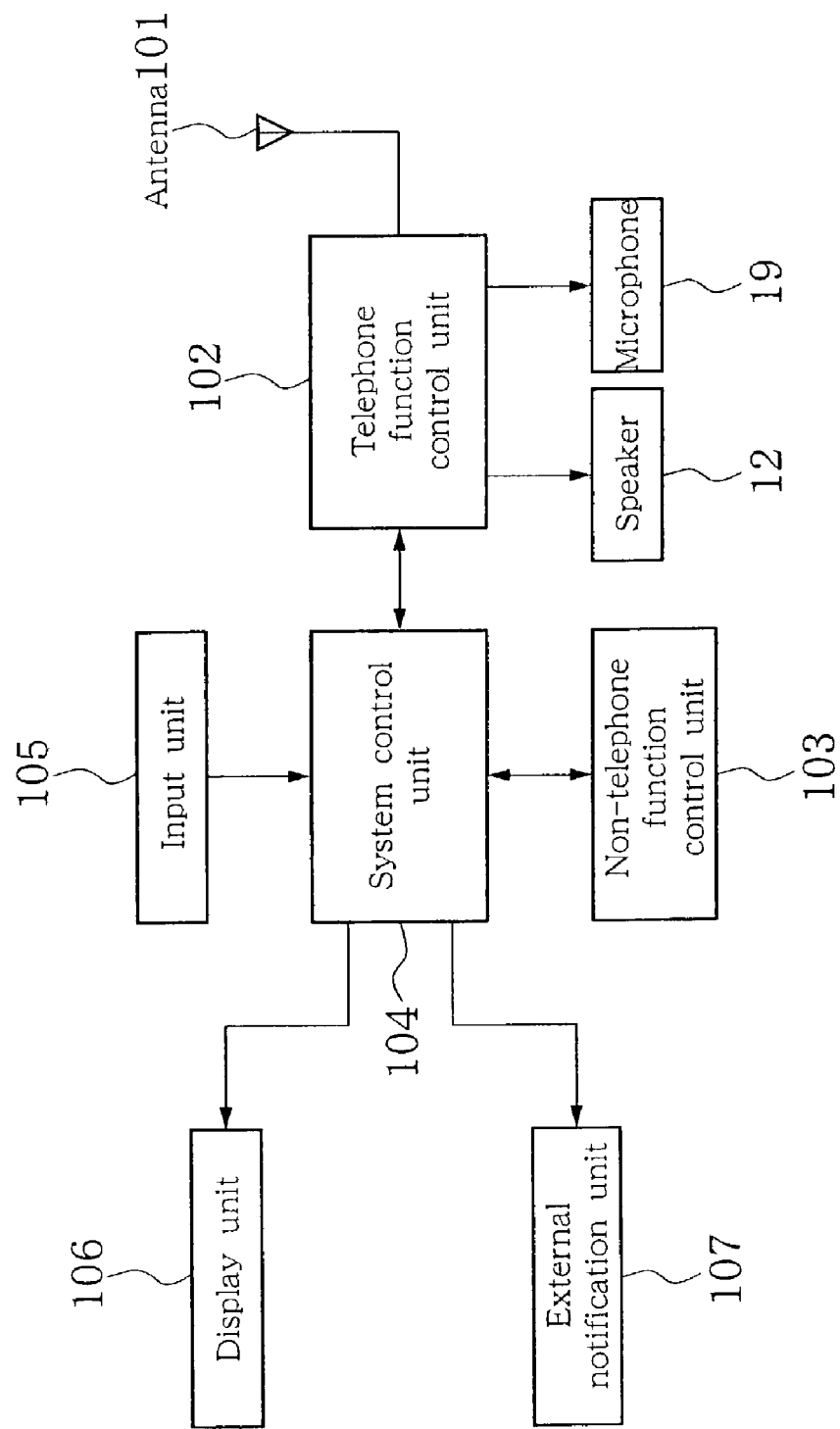
FIG. 4 is a block diagram illustrating a system configuration of a portable telephone according to an embodiment of the present invention.

Power key 14, mode key 15, telephone function operation changeover keys 16 and 17, and dial keys 18 are each manually operated, and the content of those operations is transferred as information to a system control unit 104 (FIG. 4). The telephone function operation changeover key 16 is installed on the front face, aligned with power key 14 and mode key 15, and the telephone function operation changeover key 17 is installed on a side face of the main body 10a as shown in FIG. 2. The telephone function operation changeover key 17 is provided at a position where a user can easily press the key 17 when the user holds the main body 10a by hand. Operation examples of the telephone function operation changeover key 16 will be described in the present embodiment and operation examples of the telephone function operation changeover key 17 will be described in a second embodiment.

With respect to the external notification units 20 and 21, external notification unit 20 is installed on the upper back face of the main body 10a, which is the same face as the antenna 11 is located on, so as to be easily recognized by those in the vicinity. The unit 21 is installed on the back face, and when transmission function is not active the unit 21 allows a third person to recognize that by light information such as from an LED. The external notification units 20 and 21 have functions as notification means for indicating active or inactive state of telephone functions.

FIG. 4 is a block diagram illustrating a system configuration of the above multifunctional portable telephone.

In FIG. 4, the multifunctional portable telephone is composed of an antenna 101 for performing radio communication; a telephone function control unit 102 (communication means) for controlling telephone functions as a whole; a non-telephone function control unit 103 for controlling non-telephone functions such as creating and editing e-mails and playing games; a system control unit 104 (control means, transmission and reception stopping means) for controlling the entire device; an input unit 105 (instruction means) comprising function keys for inputting information into the portable telephone, such as a mode key 15, telephone function operation changeover keys 16 and 17, and dial keys 18 in FIG. 1; a display unit 106 (a second notification means) comprising an LCD, etc. for displaying personal information, state of the system, etc.; and an external notification unit 107 (notification means) for making external notifications on operating state of telephone functions.

The telephone function control unit 102 is a processing circuit for implementing transmission and reception communication. It is composed of a microphone 19, a speaker 12, a base band section which is needed for controlling radio wave transmission and reception when conducting two-way communication with a base station, a voice codec section which converts voice data to electric signals for transmission and reception, an RF control section (the latter three are not shown in the figure). The RF control section utilizes the antenna 101 to convert radio wave signals to electric signals. The telephone function control unit 102 is in an active state, that is radio wave transmission and reception is carried out.

The system control unit 104, which is composed of a microcomputer, etc., controls the entire device together with the operating state of the telephone function control unit 102. It further controls operations of the non-telephone function control unit 103, the input unit 105, the display unit 106 and the external notification unit 107. The system control unit 104 comprises a transmission and reception stopping means for stopping the telephone function control unit 102 from conducting radio wave transmission or transmission and reception. At the same time, the system control unit 104 stops the telephone function control unit 102 from transmitting or transmitting and receiving radio waves while a function other than a function utilizing radio wave transmission or transmission and reception is being performed, and it controls the notification by the external notification unit 107 that radio wave transmission or transmission and reception is in a stop state. Radio wave transmission or transmission and reception of the telephone function control unit 102 is stopped, for example, by stopping power supply to a transmission function unit.

The above microcomputer has a ROM, a RAM, and an EEPROM (electrically erasable programmable ROM), which is an electrically rewritable nonvolatile memory. It stores various data such as program and communication control data for a control unit 21, and further identification codes for the multifunctional portable telephone 10, etc. In addition, it has timekeeping function (timekeeping means) inside, and thus it can measure a certain time period by using this function. The measured time is transferred to the telephone function control unit 102 and non-telephone function control unit 103, and used for stopping/initiating telephone functions at every interval of a predetermined time and for schedule management, etc. in the non-telephone function control unit 103.

The display unit 106 displays numbers inputted through the dial keys, various screens for non-telephone functions, icons for indicating operating state of telephone functions, etc. Further, the display unit 106 has a function as a second notification means to inform by means of icons, etc. that radio wave transmission or transmission and reception is in a stop state or that the stop state is cancelled The external notification unit 107, which is represented by external notification units 20 and 21 in FIGS. 1 to 3, informs that radio wave transmission or transmission and reception is in a stop state by light information such as from an LED, and allows a third person to recognize whether telephone functions are active or inactive. It is important that the external notification unit 107 is located at an outstanding place in the line of the third person's sight, such as the upper part of back face or the upper face of the portable telephone 10. The light information is represented by operation patterns such as lighting, flashing, or blackout. By using light information as a notification method, it is possible to make the third person clearly recognize whether or not radio wave transmission or transmission and reception is performed.

When considering the future of portable telephones, notification means or a method as introduced in the present invention is likely to be standardized. That is, when portable telephones are more widespread, more problems mentioned above will arise and in such a case it is anticipated that there will be a demand for standardized functions for portable telephones. For example, whenever a portable telephone has an operation pattern wherein the light is flashed twice and blacked out for a while, and then again flashed twice, people can always recognize, in the case of any product, by this operation pattern that radio wave transmission is not being performed. Such type of standardization may be carried out in the future. Therefore, a method which applies such an operation pattern so as to enable recognition of the current state of the portable telephone is considered effective.

Hereinbelow, operations of the portable telephone having the above configuration will be described.

Figure 5:
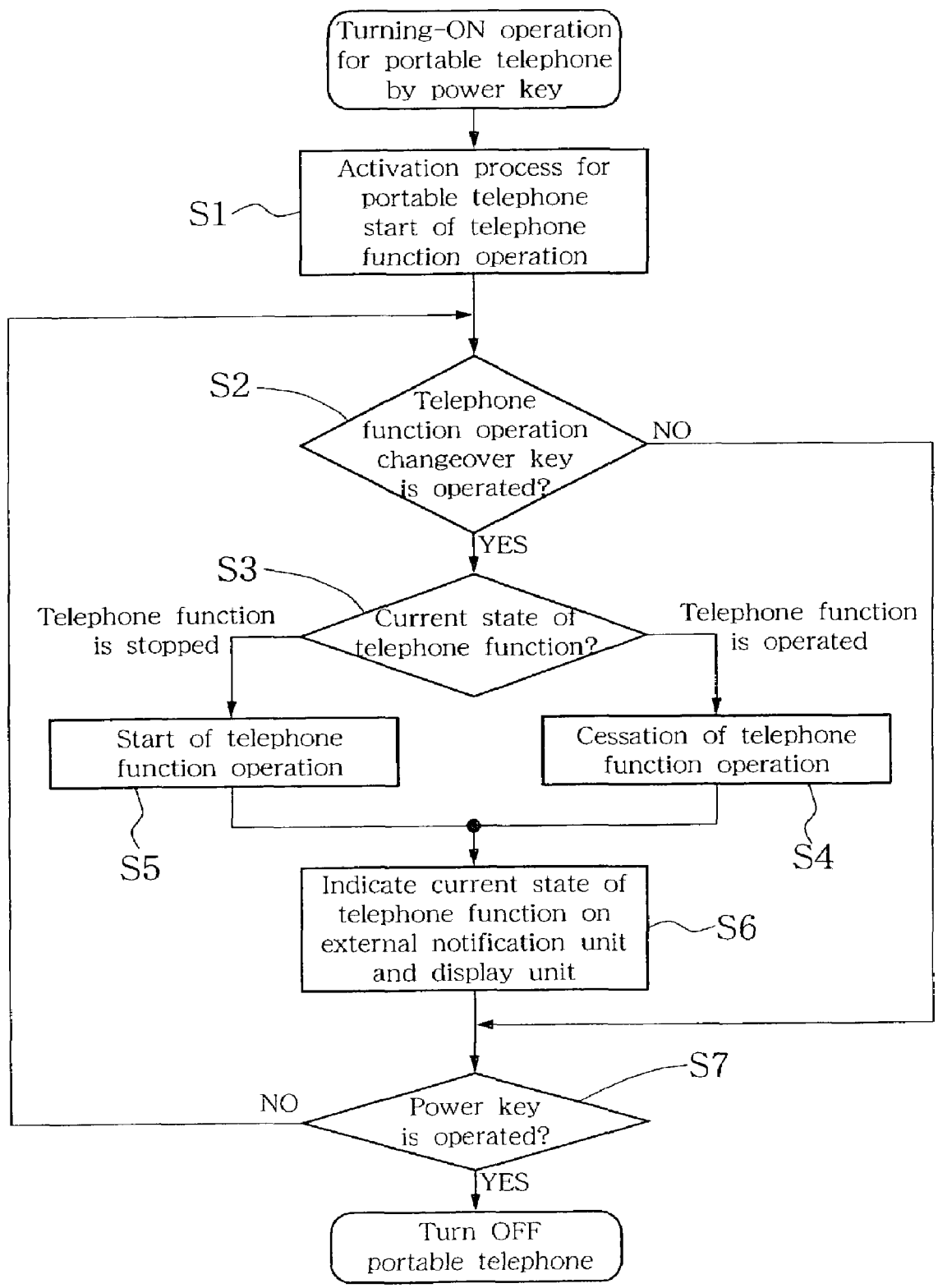
FIG. 5 is a flow chart illustrating steps in an operation of a portable telephone according to an embodiment of the present invention.

FIG. 5 is a flow chart illustrating steps in an operation of telephone function of the above multifunctional telephone and in the figure "S" represents each step of the flow.

The multifunctional portable telephone is turned on by operating the power key 14, and then the system control unit 104 utilizes the telephone function control unit 102 so as to initiate operation of telephone functions.

When the turning-on operation for the portable telephone is conducted by the power key 14, in Step S1 portable telephone startup processing and operation of telephone functions are initiated. This enables the portable telephone to initiate communications with a base station, that is, telephone functions are available.

In addition, in order to inform a user that the portable telephone is turned on, the display unit 106 may display suitable information. For example, the current time may be taken from management information from the clock function, which is a non-telephone function, and displayed.

For use of telephone functions, input of numbers, etc. through the dial keys 18 or other input keys (e.g. call key) enables telephone functions to be used.

Further, for use of various non-telephone functions, operations of the mode key 15, combined with operations of other input keys, or the like can activate a non-telephone function of interest. Incidentally, even in this state it is possible to keep telephone functions active. In this case, the portable telephone transmits radio waves for communications with a base station at a predetermined interval and at the same time stays in reception mode for receiving an incoming call. Thus, when it receives an incoming call, calling operations such as a calling sound are operated.

When a user does not use telephone functions but uses only non-telephone functions in an area or in a situation where use of the portable telephone is restricted or prohibited, e.g. on trains or in hospitals where radio waves are likely to adversely affect precision instruments, the telephone function operation changeover key 16 is operated so as to stop telephone functions. This can change over the state of radio wave transmission or transmission and reception, and allows a third person to easily recognize that telephone functions are inactive even when the user is present in an area or in a situation where use of the portable telephone is restricted or prohibited. As a result, misunderstanding or disturbance can be avoided.

Herein, the stop state of telephone functions means a state in which radio waves are not transmitted or received. In this case, the problem to be focused on is the emission of radio waves, and therefore it can be assumed that radio waves are not being transmitted from the telephone even though they are being received.

Referring back to the flow chart of FIG. 5, in Step S2, whether or not the telephone function operation changeover key 16 is operated is judged, and when the telephone function operation changeover key 16 is operated, in Step S3 the system control unit 104 judges operating state of the current telephone functions (Step S3).

When telephone functions are in operation, that is, radio waves are being transmitted and received, in Step S4, a stop signal for telephone function is sent to the telephone function control unit 102, then proceeding to Step S6. The base band processing section or the RF control section of the telephone function control unit 102 receives this signal, and then conducts processing for stop of telephone functions.

In this case, when telephone functions are completely stopped, the base band processing section or the RF control section can also be completely stopped. Therefore, the telephone function control unit 102 itself may be turned off. This enables the telephone function control unit 102 to consume no electric power during operation, thus resulting in the reduction of power consumption as a whole of the portable telephone. In addition, in order to make the transmission and reception function inactive, rather than carrying-current to the whole transmission section of the transmission and reception function unit, power supply to the last stage amplifier of the transmission section may be controlled. This allows changing over between active and inactive states of the transmission and reception function. This produces the effect of reducing the time necessary for changing over the transmission function from an inactive to an active state.

In the above Step S3, when telephone functions are stopped, a signal for telephone function changeover is sent to the telephone function control unit 102 in Step S5 by operating the telephone function operation changeover key 16, then proceeding to Step S6. Namely, in order to activate telephone functions from the stop state thereof, operation of the telephone function operation changeover key 16 enables the system control unit 104 which receives the signal to send the signal to the telephone function control unit 102 for outputting radio waves. Then, radio wave transmission and reception by telephone function control unit 102 makes telephone functions operational, so that the portable telephone can be used as a telephone as usual.

In Step S6, the system control unit 104 reflects the current telephone function state to the external notification unit 107 and the display unit 106. Specifically, when telephone functions of a portable telephone in use are in a stop state, the system control unit 104 controls displaying icons, etc. on the display unit 106, which indicate that the telephone functions are stopped so that a user can easily recognize it. Also, the system control unit 104 controls the external notification units 20 and 21 so as to allow a third person in the vicinity to recognize that the portable telephone has ceased its telephone functions. The external notification units 20 and 21 emit light in predetermined patterns thereby informing the third person in the vicinity that the portable telephone has ceased its telephone functions.

Next, in Step S7 whether or not the power key 14 is operated is judged, and when the power key 14 is not operated, the process goes back to the above Step S2 for repeating the same processing. However, when the power key 14 is operated, the portable telephone is turned off and then this flow is terminated. When a user wishes to turn off the portable telephone, it can be realized by operating the power key 14 in this way.

Figure 6:
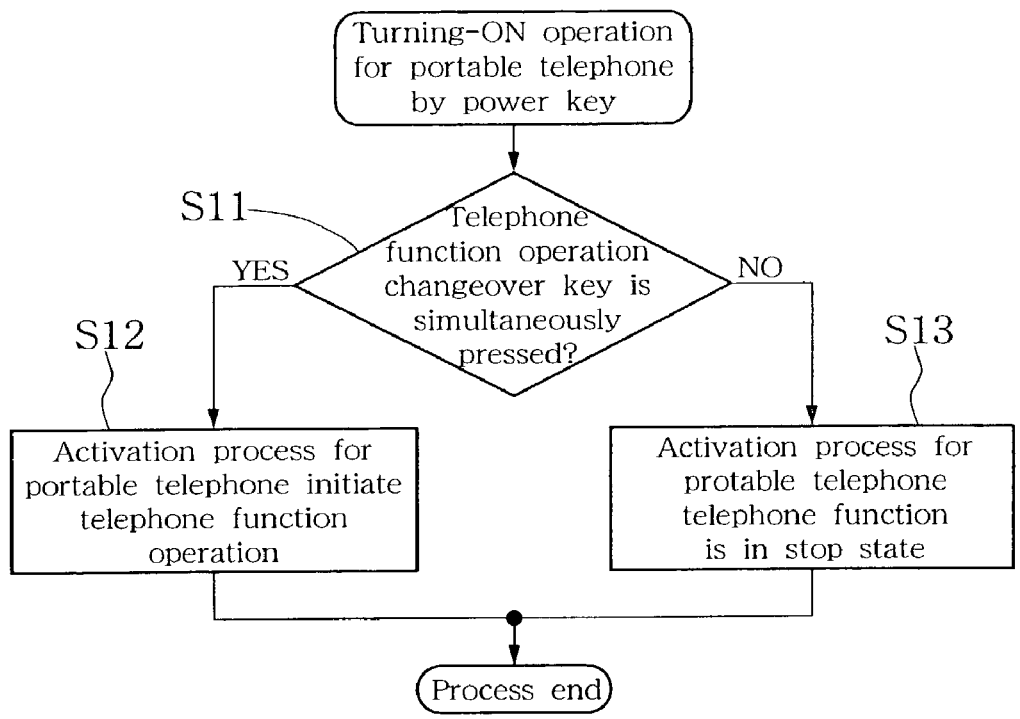

FIG. 6 is a flow chart illustrating one example of steps in an operation of the above multifunctional portable telephone immediately after power is turned on, and turning-on operation by the power key 14 starts the processing.

First, in Step S11 it is judged whether or not the telephone function operation changeover key 16 is pressed at the same time as the power key 14. In order to change from state where the portable telephone is turned off to a state where non-telephone functions are available without operation of telephone functions, operation methods such as turning-on by the power key 14 while pressing the telephone function operation changeover key 16 are used.

When the telephone function operation changeover key 16 is pressed at the same time, processing for portable telephone activation is carried out in Step S12, thereby starting telephone function operation and terminating this flow. When the telephone function operation changeover key 16 is not pressed at the same time, processing for portable telephone activation is carried out in Step S13, thereby making telephone function operation inactive and terminating this flow.

In this way, the stop state of radio wave transmission or transmission and reception can be cancelled when the power key 14 is turned on while the telephone function operation changeover key 16 is pressed. This prevents the portable telephone from being unintentionally reverted to a state of transmission when the telephone function operation changeover key 16 is pressed by accident.

Figure 7:
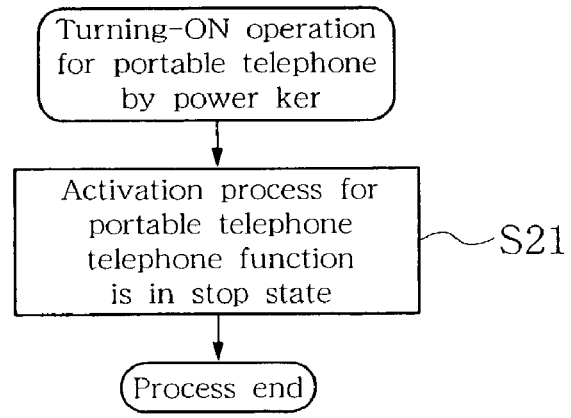

FIG. 7 is a flow chart illustrating another example of steps in an operation of the above multifunctional portable telephone immediately after power is turned on.

As a way of using the a portable telephone, immediately after the portable telephone is turned on by operating the power key 14, the portable telephone can be activated with telephone functions in a stop state (Step S21). Thereafter, a user operates the telephone function operation changeover key 16 for canceling the stop state of the telephone functions, thereby enabling the portable telephone to conduct radio wave transmission and reception.

Figure 8:
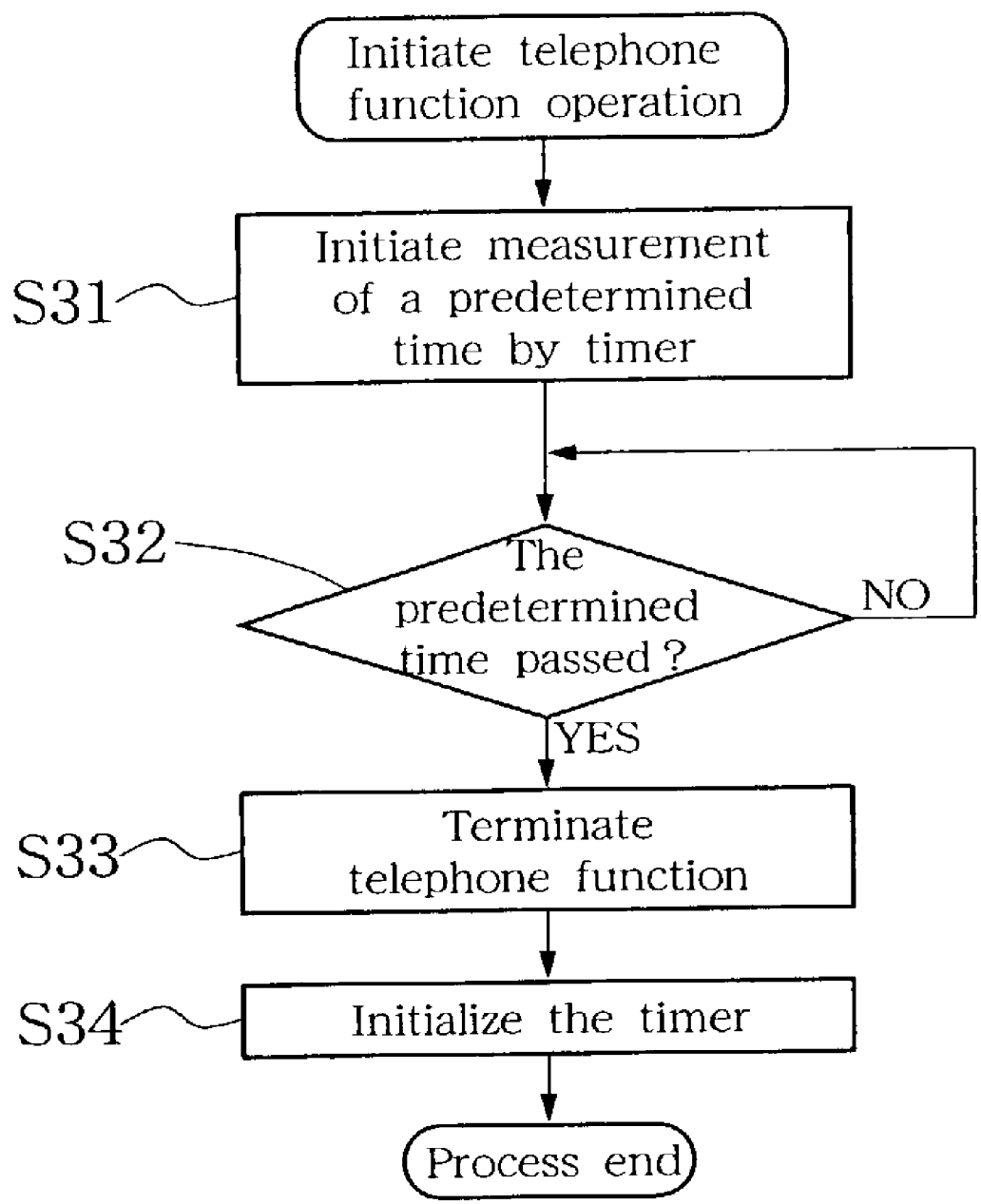
FIG. 8 is a flow chart illustrating steps in an operation of the telephone function of a portable telephone according to an embodiment of the present invention.

FIG. 8 is a flow chart illustrating steps in an operation of the telephone function of the above multifunctional portable telephone.

First, in Step S31 a predetermined time measurement by a timer is started using clock function of the system control unit 104. This is a process to measure a predetermined time for a telephone function operating state using the timer which is used as clock function of non-telephone functions. As the predetermined time has passed, telephone functions are stopped in Step S33, and the timer is initialized in Step S34, thus terminating this flow. Further, a process of outputting a notification sound prior to the cessation of the telephone calling function may be added thereto for giving advanced notification. This flow can prevent the portable telephone from being in the state of radio wave transmission or transmission and reception when the user forgets to operate the telephone function control.

The purpose of the processing flow described above is to make it so that radio wave transmission and reception cannot be carried out without direct operations of the portable telephone by a user. The user must expressly intend to transmit radio waves. Further, a function for stopping a telephone call after a predetermined time has passed may be included in the specification and this is expected to prevent a long telephone conversations.

The telephone function operation changeover key 16 for controlling operations of telephone functions should preferably be installed at a place such as on the front face or side face of the portable telephone, where a user can easily recognize and control it. Changeover procedures of telephone should also be achieved by simple operations (in the case of the present embodiment, only pressing a dedicated changeover key 16 is enough). This can prevent a user from making a mistake and forgetting to input settings or from not doing setting due to the demands of complicated operations.

As described above, the multifunctional portable telephone of the present embodiment is composed of the telephone function control unit 102 which controls the whole telephone functions, the non-telephone function control unit 103 which controls non-telephone functions, the system control unit 104 which controls the whole device, the input unit 105 comprising the mode key 15, the telephone function operation changeover keys 16 and 17, the dial keys 18 and the like, the display unit 106, and the external notification unit 107 which makes an external notification of operating state of the telephone functions. When the system control unit 104 conducts processing of functions other than functions which requires radio wave transmission and reception, it stops radio wave transmission or transmission and reception by means of the telephone function control unit 102 as well as controls the notification given by the external notification means 107, which informs that the radio wave transmission or transmission and reception is in a stop state. Therefore, this allows a third person to easily recognize that telephone functions are in a stop state even when the user of the multifunctional portable telephone is present in an area or in a situation where use of the portable telephone is prohibited or restricted, thereby avoiding the occurrence of misunderstanding or disturbance. Namely, in areas where communication by a portable telephone is prohibited, such as hospitals, a notification is given to neighbors, which indicates that the transmission function is inactive, and thus this does not cause any needless concern among the people in the vicinity.

Further, the specification of the portable telephone according to the present invention includes a function which disables radio wave transmission and reception unless the user himself directly carries out the operation. Thus, the user is made to expressly intend to transmit radio waves, and as a result the user can be stopped from forgetting to input the settings or intentionally making no setting.

It is noted that although the external notification units 20 and 21 are installed on the same face as the antenna 11, which permits easy recognition from neighbors in the present embodiment, they can be installed at any place. For example, as the external notification unit 21 is shown in FIG. 2, they may be installed on the back face of the main body 10*a*. In addition to light being emitted by a light emitting diode, a light source may be covered with an icon showing that strong electromagnetic waves are not being emitted and the icon may be lit up.

Next, a second embodiment of the present invention will be described.

In the first embodiment, the control for operation/stopping of the telephone functions is carried out by operations by the user of a portable telephone. However, if the user does not perform the setting, the function, though being installed, is not used. In other words, it is considered that radio waves may be transmitted even in an area or in a situation where use of portable telephones is prohibited or restricted. According to the present embodiment, the effect of the present invention can be exhibited even in such a case.

A multifunctional portable telephone of the present embodiment has the same hardware configuration as the multifunctional portable telephone of the first embodiment shown in FIGS. 1 to 4. The present embodiment is an example wherein, as a telephone function operation changeover key, a telephone function operation changeover key 17 is used, which is installed on a side face of the main body 10*a* in FIG. 2.

Figure 9:
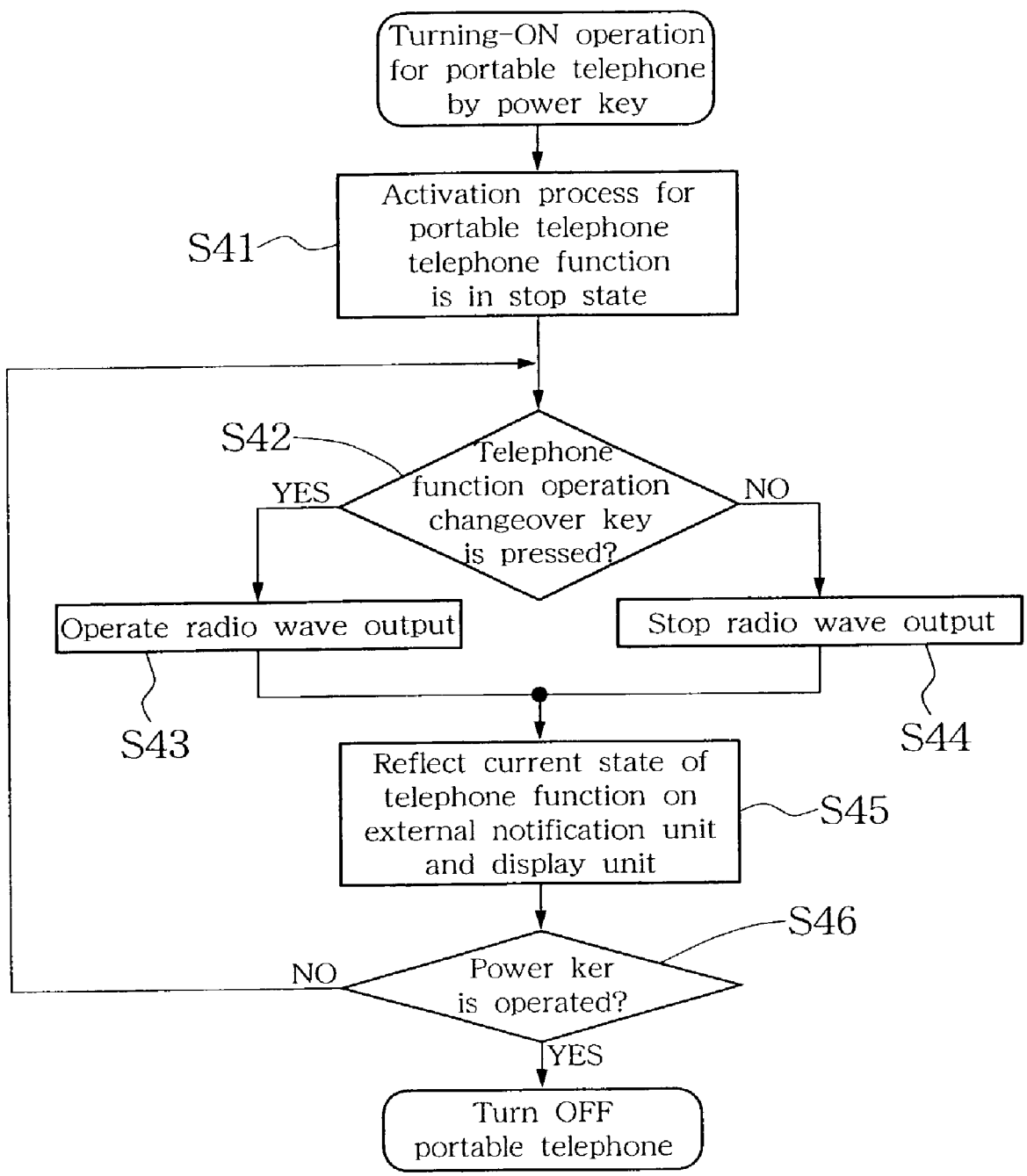
FIG. 9 is a flow chart illustrating steps in an operation of a multifunctional portable telephone according to a second embodiment of the present invention.
Figure 10:
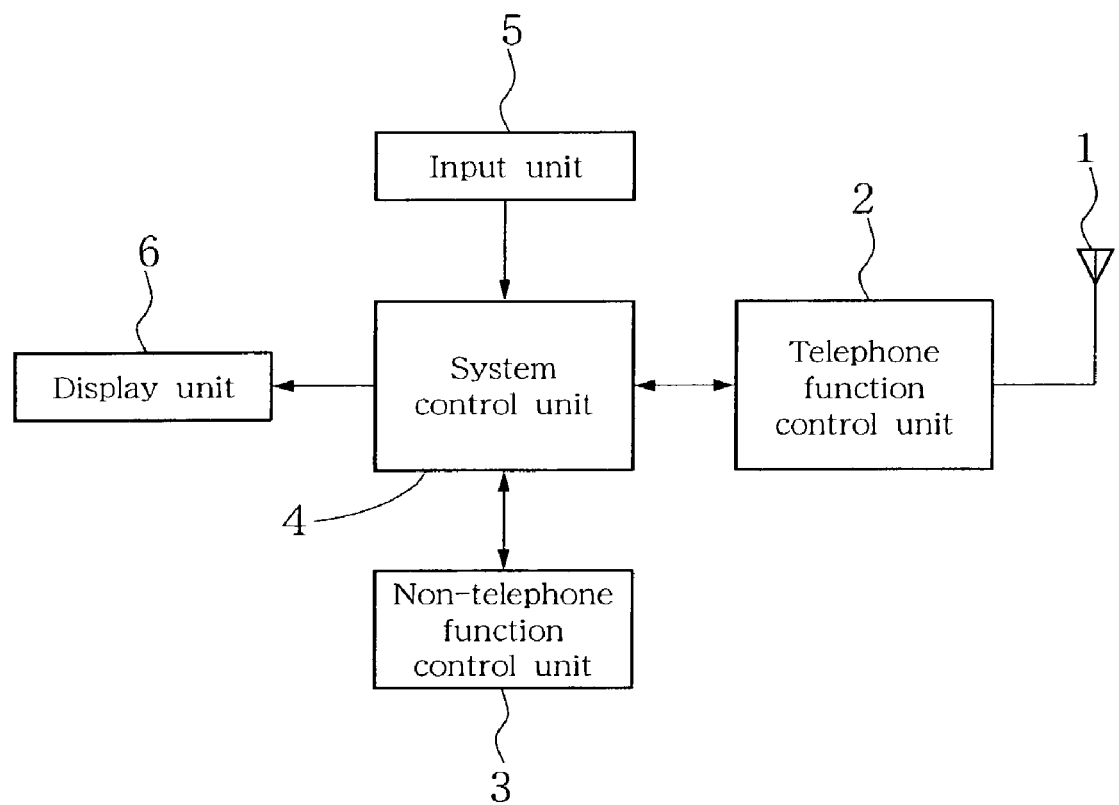
FIG. 10 is a block diagram illustrating a configuration of a conventional multifunctional portable telephone.

FIG. 9 is a flow chart illustrating steps in an operation of a multifunctional portable telephone according to the second embodiment of the present invention. Turning-on operation of the portable telephone by a power key 14 enables processing to start.

As mentioned above, in order to avoid inconvenience when a user does not set controls for operation/stop of the portable telephone, the multifunctional portable telephone of the present embodiment is first turned on by the power key 14 in Step S41. Then, even when the telephone function control unit 102 is made into an active state, only a function for incoming calls, that is the radio wave reception function, is operated, and the radio wave transmission function is not operated.

Next, in Step S42, it is judged whether or not the telephone function operation changeover key 17 is pressed. In the case where radio wave transmission is necessary, the telephone function operation changeover key 17 needs to be kept pressed down. In order to keep the telephone function operation changeover key 17 pressed down when radio wave transmission is necessary, the key 17 is to be installed on a side face of the main body 10*a* and the key 17 is to have a mechanism which allows the key to return to the original position when a user's hand is released from the pressed key. This telephone function operation changeover key 17 is installed on a side face of the main body 10*a* in this embodiment, but the key is installed on any place as long as it is easily operable. For example, it can be installed on an upper side face of the portable telephone.

In the above Step S42, when the system control unit 104 acknowledges that the telephone function operation changeover key 17 is being pressed down, the system control unit sends a signal to the telephone function control unit 102 in Step S43. This permits radio wave output only while the key is pressed, then proceeding to the Step S45.

In the above Step S42, when the telephone function operation changeover key 17 returns to the original position, the system control unit sends a signal which stops radio wave output in Step S44, then proceeding to the Step S45.

In Step S45, the system control unit 104 enables the external notification unit 107 and the display unit 106 to indicate the current state of the telephone function. Specifically, when telephone functions of a portable telephone in use are in a stop state, the system control unit 104 controls displaying an icon, etc. which indicates the stop state on the display unit 106 so that a user can easily recognize that the telephone functions are in a stop state. In addition, the system control unit 104 controls the external notification units 20 and 21 so that a third person in the user's vicinity can easily recognize that the portable telephone has stopped the telephone functions. The external notification units 20 and 21 emit light at a predetermined pattern and inform the third person in the vicinity that the portable telephone has stopped telephone functions.

Next, in Step S46, it is judged whether or not the power key 14 is operated. When the power key 14 is not operated, the process goes back to the Step S42 and then the above process is repeated. When the power key 14 is operated, the portable telephone is turned off and this flow is terminated. When a user wishes to turn off the portable telephone, it can be accomplished by operating the power key 14 in this way.

As described above, according to the second embodiment, radio wave transmission or transmission and reception is stopped immediately after the portable telephone is turned on, and then operation for canceling transmission and reception stop function is conducted, thereby first allowing the control of radio wave transmission or transmission and reception. This can prevent a user of the portable telephone from forgetting to input the settings or from intentionally making no settings with respect to stopping telephone functions in an area or in a situation where use of the portable telephone is prohibited or restricted.

It is noted that the above embodiments examples are shown wherein the present invention is applied to a multifunctional portable telephone having functions such as creating e-mails, viewing telephone numbers, playing games, etc., but the present invention is applicable to any device as long as it is a portable telephone which performs transmission and reception. Examples thereof include a PHS (Personal Handy-Phone System) which has a base unit and a plurality of handsets connected therebetween via wireless communication, and a portable information terminal such as a PDA and a small size laptop computer, which have wireless communication functions. Further, the present invention is also applicable in the same way to communication equipment which has radio wave transmission and reception function, and examples thereof includes a Bluetooth device which enables a wireless LAN.

Although, in each embodiment described above, there are explained examples wherein light emitting diodes of the external notification units 20 and 21 are flashed as the notification means, any notification method, for example, voice may be usable. When voice is used as the notification method, a portable telephone is provided with a voice outputting unit comprising a voice data generation tip, a D/A converter, an amplifier, a speaker, and the like. A message content which indicates radio wave transmission or transmission and reception is available is generated by speech synthesis using the voice data generation tip, and the generated voice is outputted through the speaker. Further, a message indicating that a user is present in a communication prohibited area or a message indicating that radio wave transmission or transmission and reception is in a stop state, can be displayed in the display unit 106. In addition to the display, voice or sound can be used for these notifications.

Furthermore, type and number of each circuit unit constituting the above portable telephone, for example, notification unit and display unit, connection method, and communication system are not limited to the above mentioned embodiments.

All publications, patents and patent applications cited herein are incorporated by reference in their entirety.

What is claimed is:

1. A portable telephone comprising:
communication means which performs radio communication by transmission and reception of radio waves;
transmission and reception stopping means which enables stopping radio wave transmission or transmission and reception of the communication means;
notification means disposed at a location such that a third person is notified that radio wave transmission or transmission and reception is in a stop state;
control means which controls the transmission and reception stopping means to deactivate the radio wave transmission or transmission and reception when a function other than a function utilizing radio wave transmission or transmission and reception is being performed, and which controls the notification means such that a third person is notified that radio wave transmission or transmission and reception is in a stop state; and
an operation key for canceling the stop state of radio wave transmission or transmission and reception stopped by the transmission and reception stopping means,
wherein the control means cancels the stop state of radio wave transmission or transmission and reception stopped by the transmission and reception stopping means when the operation key is kept in operation for a predetermined period.

2. The portable telephone according to claim 1, further comprising instruction means which instructs whether or not the notification is to be given by the notification means.

3. The portable telephone according to claim 1, wherein the notification means gives the notification by light or voice information.

4. The portable telephone according to claim 2, wherein the notification means gives the notification by light or voice information.

5. The portable telephone according to claim 1, further comprising a second notification means which informs that radio wave transmission or transmission and reception is in the stop state due to the transmission and reception stopping means or that the stop state is cancelled.

6. The portable telephone according to claim 1, wherein radio wave transmission or transmission and reception of the communication means is stopped by stopping power supply to a transmission function unit.

7. A portable telephone comprising:
communication means which performs radio communication by transmission and reception of radio waves;
transmission and reception stopping means which enables stopping radio wave transmission or transmission and reception of the communication means;
notification means disposed at a location such that a third person is notified that radio wave transmission or transmission and reception is in a stop state;

control means which controls the transmission and reception stopping means to deactivate the radio wave transmission or transmission and reception when a function other than a function utilizing radio wave transmission or transmission and reception is being performed, and which controls the notification means such that a third person is notified that radio wave transmission or transmission and reception is in a stop state; and an operation key for canceling the stop state of radio wave transmission or transmission and reception stopped by the transmission and reception stopping means, wherein:

the control means stops radio wave transmission or transmission and reception by the transmission and reception stopping means immediately after the portable telephone is turned on; and the control means cancels the stop state of radio wave transmission or transmission and reception stopped by the transmission and reception stopping means when the operation key is operated.

8. A portable telephone comprising:

communication means which performs radio communication by transmission and reception of radio waves;

transmission and reception stopping means which enables stopping radio wave transmission or transmission and reception of the communication means;

notification means disposed at a location such that a third person is notified that radio wave transmission or transmission and reception is in a stop state;

control means which controls the transmission and reception stopping means to deactivate the radio wave transmission or transmission and reception when a function other than a function utilizing radio wave transmission or transmission and reception is being performed, and which controls the notification means such that a third person is notified that radio wave transmission or transmission and reception is in a stop state; and timekeeping means which measures time while radio wave transmission or transmission and reception is being performed, wherein the control means stops radio wave transmission or transmission and reception by the transmission and reception stopping means when the timekeeping means has measured a predetermined time period.

9. A portable telephone comprising:

radio communication processing means which performs radio communication processing;

non-radio communication processing means which performs non-radio communication process that is free from radio communication processing;

radio communication processing stopping means which stops operation of the radio communication processing means;

notification means disposed at a location such that a third person is notified that the radio communication processing means is in a stop state; and an operation key for canceling the stop state of radio communication processing means stopped by the radio communication processing stopping means, wherein the stop state of radio communication processing means stopped by the radio communication processing stopping means is canceled when the operation key is kept in operation for a predetermined period.

10. The portable telephone according to claim 9, wherein the notification means is activated when the operation of the radio communication processing means is stopped by the radio communication processing stopping means.

* * * * *